United States Patent
Endo

(10) Patent No.: US 9,525,172 B2
(45) Date of Patent: Dec. 20, 2016

(54) NONAQUEOUS ELECTROLYTE SECONDARY BATTERY AND METHOD FOR PRODUCTION OF NONAQUEOUS ELECTROLYTE SECONDARY BATTERY

(71) Applicant: GS YUASA INTERNATIONAL LTD., Kyoto-shi, Kyoto (JP)

(72) Inventor: Daisuke Endo, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 71 days.

(21) Appl. No.: 13/932,457

(22) Filed: Jul. 1, 2013

(65) Prior Publication Data

US 2014/0011091 A1  Jan. 9, 2014

(30) Foreign Application Priority Data

Jul. 4, 2012 (JP) ................................. 2012-150486
Mar. 15, 2013 (JP) ................................. 2013-053061

(51) Int. Cl.
  *H01M 4/505* (2010.01)
  *H01M 4/525* (2010.01)
  (Continued)

(52) U.S. Cl.
  CPC ............. *H01M 4/505* (2013.01); *H01M 4/131* (2013.01); *H01M 4/133* (2013.01); *H01M 4/364* (2013.01);
  (Continued)

(58) Field of Classification Search
  CPC ...... H01M 4/505; H01M 4/525; H01M 4/583; H01M 10/0525; H01M 10/44
  (Continued)

(56) References Cited

U.S. PATENT DOCUMENTS 6,677,082 B2   1/2004  Thackeray et al.
7,135,252 B2   11/2006 Thackeray et al.
(Continued)

FOREIGN PATENT DOCUMENTS

EP   2219251    8/2010
EP   2634148    9/2013
(Continued)

OTHER PUBLICATIONS

Extended European Search Report dated Nov. 5, 2013 filed in corresponding European Application No. 13174701.6.
(Continued)

*Primary Examiner* — Karie O'Neill Apicella
(74) *Attorney, Agent, or Firm* — Rankin, Hill & Clark LLP

(57) ABSTRACT

Provided is a nonaqueous electrolyte secondary battery including a positive electrode, a negative electrode and a nonaqueous electrolyte, wherein the positive electrode has a positive active material containing a lithium transition metal composite oxide having an $\alpha$-NaFeO$_2$-type crystal structure and represented by the composition formula: $Li_{1+\alpha}Me_{1-\alpha}O_2$ (wherein Me is a transition metal element including Co, Ni and Mn; and $\alpha>0$), and the negative electrode has a negative active material which contains a carbon material that is a mixture of graphite and amorphous carbon and in which the ratio of the amorphous carbon contained in the carbon material is 5 to 60% by mass.

19 Claims, 3 Drawing Sheets

(51) Int. Cl.
*H01M 4/583* (2010.01)
*H01M 10/0525* (2010.01)
*H01M 10/44* (2006.01)
*H01M 4/131* (2010.01)
*H01M 4/133* (2010.01)
*H01M 4/36* (2006.01)

(52) U.S. Cl.
CPC ............. *H01M 4/525* (2013.01); *H01M 4/583* (2013.01); *H01M 10/0525* (2013.01); *H01M 10/44* (2013.01); *H01M 10/446* (2013.01); *Y02E 60/122* (2013.01)

(58) Field of Classification Search
USPC ............... 429/223, 224, 231.3; 320/128, 137
See application file for complete search history.

(56) References Cited

U.S. PATENT DOCUMENTS

2005/0142442 A1  6/2005  Yuasa et al.
2012/0280435 A1* 11/2012  Mao et al. ................... 264/681

FOREIGN PATENT DOCUMENTS

| | | | | |
|---|---|---|---|---|
| JP | 6-333558 | 12/1994 | | |
| JP | 7-307165 | 11/1995 | | |
| JP | 07307165 A | * 11/1995 | ............ | H01M 10/40 |
| JP | 10-270019 | 10/1998 | | |
| JP | 2000-58043 | 2/2000 | | |
| JP | 2004-171907 | 6/2004 | | |
| JP | 2010-050079 | 3/2010 | | |
| JP | 2010-086690 | 4/2010 | | |
| JP | 201073651 | 4/2010 | | |
| JP | 2011-054371 | 3/2011 | | |
| JP | 2011054371 A | * 3/2011 | ........ | H01M 10/0525 |
| JP | 2011154997 A | * 8/2011 | ............ | H01M 4/525 |
| JP | 2012-015051 | 1/2012 | | |
| JP | 4877660 | 2/2012 | | |
| JP | 2012-084322 | 4/2012 | | |
| JP | 2013161622 | 8/2013 | | |
| WO | 2011056847 | 5/2011 | | |
| WO | 2012039413 | 3/2012 | | |

OTHER PUBLICATIONS

Japanese Office Action dated Jun. 20, 2016 issued in the corresponding Japanese patent application No. 2013-053061.

* cited by examiner

NONAQUEOUS ELECTROLYTE SECONDARY BATTERY AND METHOD FOR PRODUCTION OF NONAQUEOUS ELECTROLYTE SECONDARY BATTERY

CROSS-REFERENCE TO RELATED APPLICATIONS

This application is based on Japanese Application No. 2012-150486 filed with the Japan Patent Office on July 4 and Japanese Application No. 2013-053061 filed with the Japan Patent Office on Mar. 15, 2013, the entire contents of which are hereby incorporated by reference.

FIELD

The present invention relates to a nonaqueous electrolyte secondary battery and a method for production of the nonaqueous electrolyte secondary battery

BACKGROUND

Currently, nonaqueous electrolyte secondary batteries represented by lithium secondary batteries are widely mounted on portable devices, and so on. For these nonaqueous electrolyte secondary batteries, principally $LiCoO_2$ is used as a positive active material. However, the discharge capacity of $LiCoO_2$ is about 120 to 130 mAh/g.

As a material of a positive active material for a lithium secondary battery, a solid solution of $LiCoO_2$ and other compounds is known. $Li[Co_{1-2x}Ni_xMn_x]O_2$ ($0 \leq x \leq \frac{1}{2}$), a solid solution having an $\alpha$-$NaFeO_2$-type crystal structure and formed of three components: $LiCoO_2$, $LiNiO_2$ and $LiMnO_2$, was published in 2001. $LiNi_{1/2}Mn_{1/2}O_2$ or $LiCo_{1/3}Ni_{1/3}Mn_{1/3}O_2$ that is one example of the aforementioned solid solution has a discharge capacity of 150 to 180 mAh/g, and is also excellent in terms of charge-discharge cycle performance.

In contrast with so-called a "$LiMeO_2$-type" positive active material as described above, so-called a "lithium-excess-type" positive active material is known in which the composition ratio Li/Me of lithium (Li) to the ratio of a transition metal (Me) is greater than 1, with Li/Me being, for example, 1.25 to 1.6 (see, for example, U.S. Pat. No. 6,677,082, U.S. Pat. No. 7,135,252, Japanese Patent No. 4877660 and JP-A-2010-50079). Such a material can be denoted as $Li_{1+\alpha}Me_{1-\alpha}O_2$ ($\alpha>0$). Here, $\beta=(1+\alpha)/(1-\alpha)$ when the composition ratio Li/Me of lithium (Li) to the ratio of a transition metal (Me) is $\beta$, and therefore, for example, $\alpha=0.2$ when Li/Me is 1.5.

U.S. Pat. No. 6,677,082 and U.S. Pat. No. 7,135,252 describe a positive active material for a lithium secondary battery, which has the general formula of $xLiMO_2 \cdot (1-x)Li_2M'O_3$ ($0 \leq x \leq 1$), The documents also describe that M is at least one or more selected from Mn, Co and Ni and that M' is Mn. The documents show that the positive active material enriched in Li has a stabilized crystal structure, and a lithium secondary battery having a high discharge capacity is obtained by using this active material.

Japanese Patent No. 4877660 describes the invention of "an active material for a lithium secondary battery comprising a solid solution of a lithium transition metal composite oxide having an $\alpha$-$NaFeO_2$-type crystal structure, wherein the composition ratio of Li, Co, Ni and Mn contained in the solid solution satisfies $Li_{1+(1/3)x}Co_{1-x-y}Ni_{(1/2)y}Mn_{(2/3)x+(1/2)y}$ ($x+y \leq 1$, $0 \leq y$, $1-x-y=z$), ($x$, $y$, $z$) is represented by a value present on the line of or within a heptagon ABCDEFG having point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45) and point G (0.45, 0.2, 0.35) as apexes, in a $Li[Li_{1/3}Mn_{2/3}]O_2(x)$-$LiNi_{1/2}Mn_{1/2}O_2(y)$-$LiCoO_2(z)$-system triangular phase diagram, and the intensity ratio of the diffraction peak of the (003) line and the (104) line in X-ray diffraction measurement is $I_{(003)}/I_{(104)} \geq 1.56$ before charge-discharge, and $I_{(003)}/I_{(104)} > 1$ at the end of discharge", (claim 1), and shows that by using the positive active material enriched in Li, a lithium secondary battery, which has a high discharge capacity, and particularly has a high discharge capacity in a potential range of 4.3 V or less, is obtained.

On the other hand, a lithium secondary battery, wherein a positive active material containing a lithium transition metal composite oxide and a negative active material containing graphite and amorphous carbon (noncrystalline carbon) are combined, is well known (see, for example, JP-A-2010-50079, JP-A-2011-54371, JP-A-2012-15051 and JP-A-2012-84322).

JP-A-2010-50079 describes the invention of "a nonaqueous electrolyte secondary battery comprising: a positive electrode containing a positive active material; a negative electrode containing a negative active material; and a non-aqueous electrolyte having lithium ion conductivity, wherein the positive active material is a lithium-containing transition metal composite oxide having a layered structure and represented by the general formula: $Li_{1+x}(Ni_aMn_bCo_c)O_{2+\alpha}$ ($x+a+b+c=1$, $0.7 \leq a+b$, $0 \leq x \leq 0.1$, $0 \leq c/(a+b) < 0.35$, $0.7 \leq a/b \leq 2.0$, $-0.1 \leq \alpha \leq 0.1$), and the nonaqueous electrolyte contains a lithium salt having an oxalate complex as an anion" (claim 1), and an object of the invention is to provide "a nonaqueous electrolyte secondary battery using as a positive active material a lithium-containing transition metal oxide, which has a layered structure and in which the main component of the transition metal includes two elements: nickel and manganese, wherein the nonaqueous electrolyte secondary battery is excellent in power characteristics and low in cost" (paragraph [0010]).

JP-A-2010-50079 also describes that for the negative active material, "a noncrystalline carbon-coated graphite formed by coating a graphite material with noncrystalline carbon is suitably used from the viewpoint of output/input characteristics" (paragraph [0033]); and a nonaqueous electrolyte secondary battery, wherein a positive active material is "$Li_{1.07}Ni_{0.42}Co_{0.09}Mn_{0.42}O_2$" and a negative active material is "a graphite coated on the surface with noncrystalline carbon", as Example 8 (paragraphs [0042] and [0056] to [0058])".

JP-A-2011-54371 describes the invention of "a lithium ion secondary battery comprising: a positive electrode containing a positive active material capable of inserting/extracting lithium ions; a negative electrode containing, as a negative active material capable of inserting/extracting lithium ions, a carbon material in which an noncrystalline carbon material constituting 55% by weight to 85% by weight (inclusive) of the whole negative active material and a graphite material constituting 15% by weight to 45% by weight (inclusive) of the whole negative active material are mixed; and a nonaqueous electrolyte solution for wetting the positive electrode and negative electrode" (claim 1), and the invention "has as an object the provision of a lithium ion secondary battery, of which input/output characteristics can be improved" (paragraph [0007]).

JP-A-2011-54371 also describes that "by including as a negative active material a carbon material in which an noncrystalline carbon material as a principal material and a graphite material as an auxiliary material are mixed, input characteristics can be improved because the noncrystalline carbon material has a high charge capacity and high retention as compared to the graphite material, and power characteristics can be improved because the graphite material can keep the battery voltage high and has a small reduction in power in an end stage of discharge as compared to the noncrystalline carbon material" (paragraph [0009]), and "for the positive active material, a lithium-nickel-manganese-cobalt composite oxide is used; namely, it is a composite oxide represented by the general formula: $Li_xNi_yMn_zCo_{(1-y-z-w)}A_wO_2$ and having a layered crystal structure; here, in the general formula, x satisfies 0<x<1.2, and y and z satisfy y+z<1" (paragraph [0020]).

JP-A-2012-15051 describes the invention of "a negative electrode for a lithium ion secondary battery, which comprises: a negative current collector; and a negative composite layer disposed on the negative current collector and containing crystalline carbon and noncrystalline carbon as a negative active material, wherein the negative composite layer includes a plurality of layers, a layer closer to the negative current collector has a higher content of crystalline carbon, a layer farther from the negative current collector has a higher content of noncrystalline carbon, and in the layer closest to the negative current collector, the content of crystalline carbon is higher than the content of noncrystalline carbon" (claim 1), "a lithium ion secondary battery comprising: the negative electrode for a lithium ion secondary battery according to any one of claims 1 to 6; and a positive electrode including a positive current collector, and a positive composite layer containing a positive active material" (claim 7), and "the lithium ion secondary battery according to claim 7, wherein the positive active material is a lithium layered composite oxide represented by the general formula: $Li_xNi_yMn_zCo_{(1-y-z-w)}A_wO_2$ [wherein $1.0 \leq x \leq 1.2$, y+z+w<1, y≥z, 0≤w≤0.01, and A is at least one selected from the group consisting of Li, Al, Cr, Mg, Ti, B, F and W" (claim 8). JP-A-2012-15051 also describes that "a lithium ion secondary battery using only a graphite carbon material as a negative active material has a problem in terms of cycle life characteristics because input/output characteristics are poor, and therefore degradation of the surface is significant in repetition of high-rate charge-discharge although a high capacity is achieved; further, in •••, the mixing ratio of graphite is low, and input/output characteristics can be kept high, but it is difficult to achieve further capacity enhancement; therefore, capacity enhancement and improvement of cycle life characteristics of the lithium ion secondary battery are desired" (paragraph [0008]), and "the weight ratio of crystalline carbon and noncrystalline carbon contained in the negative composite layer is not particularly limited, but the amount of crystalline carbon contained in the whole layer is preferably larger than the amount of noncrystalline carbon; specifically, the weight ratio of crystalline carbon and noncrystalline carbon is preferably 1.3:1 to 10:1, especially preferably 1.5:1 to 5:1" (paragraph [0029]).

JP-A-2012-84322 describes a method for production of a lithium ion secondary battery, comprising an assembly step of preparing a battery which contains in a battery case an electrode body having a positive active material and a negative active material, and an electrolyte solution containing a difluorophosphoric acid salt, wherein "the positive active material is $Li_xMO_2$ (wherein M is Ni, or contains at least any one of Al, Ti, V, Cr, Mn, Fe, Co, Cu, Zn, Mg, Ga, Zr and Si in addition to Ni as a principal component), and X satisfies $1.04 \leq X \leq 1.15$", and "particles of the negative active material include graphite and noncrystalline carbon, and the ratio of the noncrystalline carbon in the particles of the negative active material ranges from 2.5 to 7.1 wt %" (claim 1).

So-called a "lithium-excess-type" positive active material described above generally has a discharge capacity higher than that of so-called a "$LiMeO_2$-type" positive active material, and thus has such a feature that by going through high-potential charge (high-potential formation) of 4.5 V (vs. $Li/Li^+$) or more in an initial charge-discharge step, a high discharge capacity is achieved even if the charge potential is subsequently decreased.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

When the "lithium-excess-type" positive active material is combined with a negative electrode using graphite to prepare a nonaqueous electrolyte secondary battery with a positive-negative electrode capacity balance comparable to that when a commercially available "$LiMeO_2$-type" positive active material is used, deposition of Li on the graphite negative electrode occurs during high-potential formation, and therefore cycle performance is deteriorated. Thus, a nonaqueous electrolyte secondary battery with such a positive-negative electrode capacity balance that deposition of Li does not occur is intended, but the problem in turn arises that the benefit of capacity enhancement by a "lithium-excess-type" positive active material cannot be obtained. Further, when a "lithium-excess-type" positive active material is combined with a graphite negative electrode, the problem also arises that power performance in a low SOC (state of charge) region is low.

On the other hand, when amorphous carbon is used for a negative electrode, charge can be performed to a deeper utilization factor of the negative electrode, and therefore an effect of suppressing deposition of Li during initial high-potential formation is obtained, but there is the problem that the actual capacity of a nonaqueous electrolyte secondary battery is considerably reduced because the irreversible capacity during initial charge-discharge is large.

The present invention has been devised in view of the problems described above, and an object thereof is to provide a nonaqueous electrolyte secondary battery having a high battery capacity and a high power while suppressing deposition of Li on a negative electrode in high-potential formation, and a method for production of the nonaqueous electrolyte secondary battery.

An aspect of the present invention includes a nonaqueous electrolyte secondary battery including a positive electrode, a negative electrode and a nonaqueous electrolyte, wherein the positive electrode has a positive active material containing a lithium transition metal composite oxide having an α-$NaFeO_2$-type crystal structure and represented by the composition formula: $Li_{1+\alpha}Me_{1-\alpha}O_2$ (wherein Me is a transition metal element including Co, Ni and Mn; and α>0). The negative electrode has a negative active material containing a carbon material that is a mixture of graphite and amorphous carbon, and the ratio of the amorphous carbon contained in the carbon material is 5 to 60% by mass.

BRIEF DESCRIPTION OF THE DRAWINGS

The foregoing and other features of the invention will become apparent to one skilled in the art to which the present invention relates upon consideration of the invention with reference to the accompanying drawings, wherein.

DESCRIPTION OF EMBODIMENTS

Figure 1:
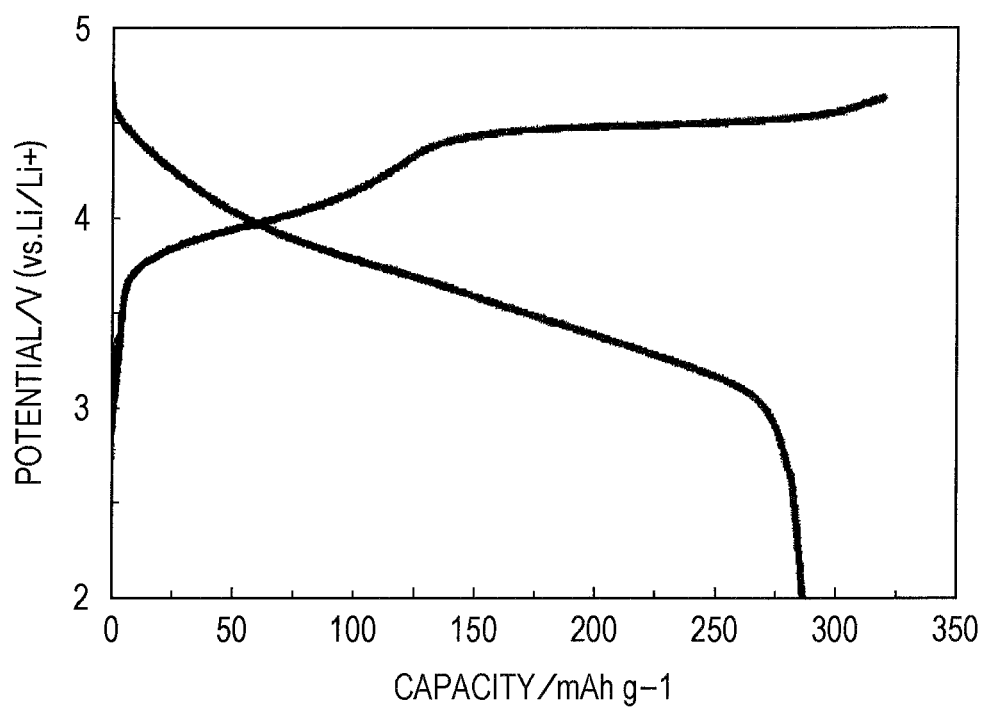
FIG. 1 is a view showing a potential behavior during initial charge-discharge step performed during a production process of a nonaqueous electrolyte secondary battery for a positive electrode having a positive active material prepared in Example 1-1.

A nonaqueous electrolyte secondary battery including a positive electrode, a negative electrode and a nonaqueous electrolyte, wherein the positive electrode has a positive active material containing a lithium transition metal composite oxide having an α-NaFeO$_2$-type crystal structure and represented by the composition formula: $Li_{1+\alpha}Me_{1-\alpha}O_2$ (wherein Me is a transition metal element including Co, Ni and Mn; and α>0). The negative electrode has a negative active material containing a carbon material that is a mixture of graphite and amorphous carbon, and the ratio of the amorphous carbon contained in the carbon material is 5 to 60% by mass.

Another aspect of this nonaqueous electrolyte secondary battery has the amorphous carbon having a half width of 60% or less, the half width being that of the (002) diffraction line in X-ray diffraction measurement.

In another aspect, the positive active material using this nonaqueous electrolyte secondary battery contains Na.

A method for production of the nonaqueous electrolyte secondary battery according to the present invention includes a charge step which at least leads to a region where a potential change occurring, with respect to a charging electric quantity, in a positive electrode potential range of more than 4.3 V (vs. Li/Li$^+$) and 4.8 V (vs. Li/Li$^+$) or less is relatively flat.

A charge step for production of the nonaqueous electrolyte secondary battery according to the present invention is a charge step in an initial charge-discharge step.

A method for production of a nonaqueous electrolyte secondary battery according to the present invention includes a charge step in which a charge capacity per negative active material is 372 mAh/g or more in the charge step.

According to the present invention, a nonaqueous electrolyte secondary battery is obtained which has a high battery capacity and a high power while deposition of Li on a negative electrode during high-potential formation is suppressed. The half width of amorphous carbon, which is mixed with graphite as a negative active material, is kept at a specific value or less to increase discharge energy of the nonaqueous electrolyte secondary battery.

The composition of a lithium transition metal composite oxide contained in an active material for a lithium secondary battery according to the present invention can be denoted as $Li_{1+\alpha}Me_{1-\alpha}O_2$ (α>0) which contains a transition metal element Me including Co, Ni and Mn as well as Li. The lithium transition metal composite oxide is so called a "lithium-excess type" which has a high discharge capacity.

The ratio of elements such as Co, Ni and Mn which form a transition metal element that forms the lithium transition metal composite oxide can be arbitrarily selected according to required characteristics.

In the present invention, the molar ratio of Li to the transition metal element Me (Li/Me), which is represented by $(1+\alpha)/(1-\alpha)$ in the composition formula of $Li_{1+\alpha}Me_{1-\alpha}O_2$, is preferably 1.2 to 1.6 because a lithium secondary battery having a high discharge capacity can be obtained. Above all, a composition in which the ratio of Li/Me is 1.25 to 1.45 is more preferably selected to obtain a lithium secondary battery which has a particularly high discharge capacity and is excellent in high rate discharge characteristics.

The molar ratio of Co to the transition metal element Me (Co/Me) is preferably 0.02 to 0.23, more preferably 0.04 to 0.21, most preferably 0.06 to 0.17, to obtain a lithium secondary battery which has a high discharge capacity and is excellent in initial charge-discharge efficiency.

The molar ratio of Mn to the transition metal element Me (Mn/Me) is preferably 0.63 to 0.72, more preferably 0.65 to 0.71, to obtain a lithium secondary battery which has a high discharge capacity and is excellent in initial charge-discharge efficiency.

In the present invention, the lithium transition metal composite oxide represented by the composition formula of $Li_{1+\alpha}Me_{1-\alpha}O_2$ (Me is a transition metal including Co, Ni and Mn and α>0) is preferably to contain Na in an amount of 900 ppm or more.

Improvement of the discharge capacity is not sufficient if the content of Na is less than 900 ppm, while the discharge capacity starts to decrease, applying paste stability is deteriorated, and processability in preparation of the electrode is deteriorated if the content of Na is more than 16000 ppm. Therefore, for improving the discharge capacity, the content of Na is set to be no less than 900 ppm and no more than 16000 ppm. The content of Na is preferably 1000 ppm or more and 12000 ppm or less, more preferably 2000 ppm or more and 10000 ppm or less.

For adjusting the content of Na to the range described above, a method in which in a step of preparing a carbonate precursor as described later, a sodium compound such as sodium carbonate is used as a neutralizer, so that Na remains in a washing step, and/or a method in which in a subsequent sintering step, a sodium compound such as sodium carbonate is added can be employed.

In a step of preparing a carbonate precursor, when a sodium compound such as sodium carbonate is used as a neutralizer, the carbonate precursor is able to contain Na in an amount of 900 ppm or more and less than 2100 ppm.

Residual Na in the neutralization/washing step during preparation of the precursor may act as a primary particle growth suppressing agent in a step of sintering so called a "lithium-excess-type" lithium transition metal composite oxide, and the electrode characteristic of a lithium secondary battery including the lithium transition metal composite oxide as a positive active material may be improved.

The lithium transition metal composite oxide of the present invention is represented by the general formula described above, is a composite oxide essentially composed of Li, Co, Ni and Mn, and contains a small amount of Na, but inclusion of a small amount of other metals, alkali metals such as K, alkali earth metals such as Mg and Ca and transition metals represented by 3d transition metals such as Fe and Zn within the bounds of not impairing the effect of the present invention, is not excluded.

The lithium transition metal composite oxide according to the present invention has an α-NaFeO$_2$ structure. The lithium transition metal composite oxide after synthesis (before charge-discharge is performed) is attributed to the space group P3$_1$12 or R3-m. Among them, in those attributed to the space group P3$_1$12, a superlattice peak (peak found in a (Li[Li$_{1/3}$Mn$_{2/3}$]O$_2$-type monoclinic crystal) is observed at around 2θ=21° on an X-ray diffraction pattern using a CuKα radiation. However, when charge is carried out at least once, so that Li in the crystal is deintercalated, the symmetry of the crystal is changed, and consequently the superlattice peak disappears, and the lithium transition metal composite oxide is attributed to the space group R3-m. Here, P3$_1$12 is a crystal structure model in which atom positions at 3a, 3b and 6c sites in R3-m are subdivided, and the P3$_1$12 model is employed when there is orderliness in atom arrangement in R3-m. Properly speaking, "R3-m" should be written with a bar "-" added above "3" of "R3m".

The lithium transition metal composite oxide according to the present invention is attributed to the space group P3$_1$12 or R3-m of the hexagonal crystal, and preferably the half width of the diffraction peak at 2θ=18.6°±1° is 0.20° to 0.27° or/and the half width of the diffraction peak at 2θ=44.1°±1° is 0.26° to 0.39° on an X-ray diffraction pattern using a CuKα radiation. In this way, the discharge capacity of the positive active material can be increased. The diffraction peak at 2θ=18.6°±1° is indexed to the (003) line in the mirror index hkl for space groups P3$_1$12 and R3-m, and the diffraction peak at 2θ=44.1°±1° is indexed to the (114) line for the space group P3$_1$12 and to the (104) line for the space group R3-m, respectively.

In another aspect of the present invention, the positive active material for a lithium secondary battery and the carbonate precursor thereof are preferably to have a 50% particle size (D50) of 5 to 10 μm in particle size distribution measurement. When the lithium transition metal composite oxide is prepared from a hydroxide precursor, excellent performance is not achieved unless the particle size is controlled to be smaller. By preparing the lithium transition metal composite oxide from a carbonate precursor, an active material having large discharge capacity is obtained even when the 50% particle size (D50) in particle size distribution measurement is 5 to 10 μm.

An active material prepared by way of a carbonate precursor has a peak differential pore volume of 0.85 mm$^3$/(g·nm) or more in a pore region of 30 to 50 nm, whereas an active material prepared by way of a hydroxide precursor has a peak differential pore volume of only about 0.50 mm$^3$/(g·nm) in a pore region of 30 to 50 nm, and the differential peak is in a pore region of about 60 nm.

In the lithium transition metal composite oxide according to another aspect of the present invention, the pore size, at which the differential pore volume determined by a BJH method from an adsorption isotherm obtained using a nitrogen gas adsorption method shows a maximum value, is in a range of 30 to 40 nm, and the peak differential pore volume is 0.85 mm$^3$/(g·nm) or more. Since the peak differential pore volume is 0.85 mm$^3$/(g·nm) or more, a lithium secondary battery excellent in initial efficiency can be obtained. When the peak differential pore volume is 1.76 mm$^3$/(g·nm) or less, a lithium secondary battery, which is not only excellent in initial efficiency but also particularly excellent in discharge capacity, can be obtained, and therefore the peak differential pore volume is preferably 0.85 to 1.76 mm$^3$/(g·nm).

Next, a method for producing the active material for a non-aqueous electrolyte lithium secondary battery according to the present invention will be described.

The active material for a non-aqueous electrolyte lithium secondary battery of the present invention can be obtained basically by preparing a raw material which contains, in accordance with the composition of an intended active material (oxide), metal elements (Li, Mn, Co, Ni and Na) that forms the active material, and sintering the raw material.

For preparing an oxide having an intended composition, so called a "solid state method" in which salts of Li, Co, Ni, Mn and Na, respectively, are mixed and sintered, and a "coprecipitation method" in which a coprecipitation precursor with Co, Ni and Mn existing in one particle is prepared beforehand, a Li salt and a Na salt are mixed and sintered therewith are known. In a synthesis process by the "solid state method", it is difficult to obtain a sample with the elements homogeneously distributed in one particle because Mn in particular is hard to be homogeneously solid soluted in Co and Ni. In literatures and the like, a large number of attempts to solid-dissolve Mn in a part of Ni and Co by the solid phase method have been hitherto made (LiNi$_{1-x}$Mn$_x$O$_2$, etc.), but a homogeneous phase is more easily obtained at an element level by selection of the "coprecipitation method". Thus, in Examples described later, the "coprecipitation method" is employed.

For preparing a coprecipitation precursor, it is very important to establish an inert atmosphere in a solution from which the coprecipitation precursor is to be obtained. Among Co, Ni and Mn, Mn is easily oxidized, so that it is not easy to prepare a coprecipitation hydroxide with Co, Ni and Mn homogeneously distributed in a divalent state, and therefore homogeneous mixing of Co, Ni and Mn at an element level tends to be incomplete. Particularly in the composition range in the present invention, the ratio of Mn is high as compared to the ratios of Co and Ni, and therefore it is particularly important to remove dissolved oxygen in an aqueous solution. Examples of the method for removing dissolved oxygen include a method in which a gas containing no oxygen is bubbled. The gas containing no oxygen is not limited, but a nitrogen gas, an argon gas, carbon dioxide (CO$_2$) or the like can be used.

Particularly, when a coprecipitation carbonate precursor is prepared as in Example described later, employment of carbon dioxide as a gas containing no oxygen is preferable because an environment is provided in which the carbonate is more easily generated.

A pH in the step of producing a precursor by coprecipitating in a solution a compound containing Co, Ni and Mn is not limited, but can be set at 7.5 to 11 when the coprecipitation precursor is prepared as a coprecipitation carbonate precursor. It is preferable to control pH for increasing the tap density. By setting pH at 9.4 or less, it can be ensured that the tap density is 1.25 g/cm$^3$ or more, so that high-rate discharge performance can be improved. Further, by setting pH at 8.0 or less, the particle growth rate can be accelerated, so that the stirring duration after completion of dropwise addition of a raw material aqueous solution can be reduced.

The coprecipitation precursor core is preferably a compound with Mn, Ni and Co mixed homogeneously. In the present invention, the coprecipitation precursor is preferably a carbonate for obtaining an active material for a lithium secondary battery, which has a high discharge capacity. A precursor having a higher bulk density can also be prepared by using a crystallization reaction using a complexing agent. At this time, by carrying out mixing/sintering with a Li source, an active material having a high density, so that the energy density per electrode area can be increased.

Examples of the raw material of the coprecipitation hydroxide precursor may include manganese oxide, manganese carbonate, manganese sulfate, manganese nitrate and manganese acetate as a Mn compound, nickel hydroxide, nickel carbonate, nickel sulfate and nickel acetate as a Ni compound, and cobalt sulfate, cobalt nitrate and cobalt acetate as a Co compound.

In the present invention, a reaction crystallization method for obtaining a coprecipitation carbonate precursor by adding dropwise a raw material aqueous solution of the coprecipitation precursor into a reaction tank kept alkaline is employed. A sodium compound such as sodium carbonate is used as a neutralizer, but it is preferred to use sodium carbonate or a mixture of sodium carbonate and lithium carbonate. Na/Li, which is a molar ratio of sodium carbonate to lithium carbonate, is preferably 0.85/1.15 [M] or more for ensuring that Na remains in an amount of 900 ppm or more as shown in Example described later. By setting Na/Li at 0.85/1.15 [M] or more, the possibility can be reduced that Na is excessively removed in a subsequent washing step, so that the content of Na is less than 900 ppm.

The rate of dropwise addition of the raw material aqueous solution significantly influences homogeneity of the element distribution within one particle of the coprecipitation precursor generated. Particularly, Mn is hard to form a homogeneous element distribution with Co and Ni, and therefore requires care. For the preferred dropwise addition rate, it depends on the size of the reaction tank, stirring conditions, pH, the reaction temperature and so on, but is preferably 30 ml/min or less. For increasing the discharge capacity, the dropwise addition rate is more preferably 10 ml/min or less, most preferably 5 ml/min or less.

When a complexing agent is present in the reaction tank, and certain convection conditions are applied, rotation and revolution of particles in a stirring tank are promoted by further continuing stirring after completion of dropwise addition of the raw material aqueous solution, and in this process, particles are grown stepwise into a concentric circular sphere while colliding with one another. That is, coprecipitation precursor is formed through reactions in two stages, i.e. a metal complex formation reaction when the raw material aqueous solution is added dropwise into the reaction tank and a precipitate formation reaction that occurs during retention of the metal complex in the reaction tank. Therefore, by appropriately selecting a time during which stirring is further continued after completion of dropwise addition of the raw material aqueous solution, a coprecipitation precursor having a desired particle size can be obtained.

For the preferred stirring duration time after completion of dropwise addition of the raw material aqueous solution, it depends on the size of the reaction tank, stirring conditions, pH, the reaction temperature and so on, but is, for example, preferably 0.5 h or more, more preferably 1 h or more for growing particles as uniform spherical particles. For reducing the possibility that the particle size is so large that the power performance of the battery in the low SOC region is not sufficient, the time is preferably 15 h or less, more preferably 10 h or less, most preferably 5 h or less.

The preferred stirring duration time for ensuring that D50, i.e. a particle size is 5 to 10 μm, at which the cumulative volume in the particle size distribution of secondary particles of the carbonate precursor and the lithium transition metal composite oxide is 50%, varies depending on controlled pH. For example, the stirring duration time is preferably 3 to 7 h when pH is controlled to 8.3 to 8.9, and the stirring duration time is preferably 1 to 5 h when pH is controlled to 7.5 to 8.0.

When particles of the carbonate precursor are prepared using as a neutralizer a sodium compound such as sodium carbonate, sodium ions deposited on particles are washed off in a subsequent washing step, and in the present invention, it is preferably to wash off sodium ions under such conditions that Na remains in an amount of 900 ppm or more. For example, such conditions that the number of washings with 200 ml of ion-exchange water is 5 can be employed when the prepared carbonate precursor is extracted by suction filtration.

Preferably the carbonate precursor is dried under normal pressure in an air atmosphere at a temperature of 80° C. to lower than 100° C. A larger amount of moisture can be removed in a short time when the carbonate precursor is dried at 100° C. or higher, but an active material showing more excellent electrode characteristics can be formed when the carbonate precursor is dried at 80° C. for a long time. Although the reason for this is not necessarily evident, the carbonate precursor is a porous material having a specific surface area of 50 to 100 $m^2/g$, and therefore has a structure in which moisture is easily adsorbed. Thus, the inventor presumes as follows: When the carbonate precursor is dried at a low temperature to ensure that measurable adsorbed water remains in a pore in the state of the precursor. Molten Li can enter the pore in such a manner as to replace adsorbed water that is removed from the pore in a sintering step of mixing the carbonate precursor with a Li salt and sintering the mixture. Consequently an active material having a more uniform composition is obtained as compared to the case where the carbonate precursor is dried at 100° C. Since a carbonate precursor obtained by performing drying at 100° C. shows is deep brown, while a carbonate precursor obtained by performing drying at 80° C. is fresh-colored, a distinction can be made by the color of the precursor.

Thus, for quantitatively evaluating the above-described difference between the precursors, the color phase of each precursor was measured and compared with JPMA Standard Paint Colors (Edition F, 2011) being compliant with JIS Z 8721 and issued by Japan Paint Manufacturers Association. For measurement of the color phase, Color Leader CR10 manufactured by KONICA MINOLTA, INC was used. According to this measurement method, the value of dL* that represents a brightness is larger when the sample is more whitish, and is smaller when the sample is more blackish. The value of da* that represents a color phase is larger when the sample is more reddish, and is smaller when the sample is more greenish (less reddish). The value of db* that represents a color phase is larger when the sample is more yellowish, and is smaller when the sample is more bluish (less yellowish).

It has become apparent that the color phase of a product by drying at 100° C. (Comparative Example) is within a range in which the standard color F05-40D is attained in a red direction as compared to the standard color F05-20B, and is within a range in which the standard color FN-25 is attained in a white direction as compared to the standard color FN-10. It has been found that above all, a color difference between the above-mentioned color phase and a color phase exhibited by the standard color F05-20B is smallest.

It has become apparent that the color phase of a product by drying at 80° C. (Example) is within a range in which the standard color F19-70F is attained in a white direction as compared to the standard color F19-50F, and is within a range in which the standard color F09-60H is attained in a black direction as compared to the standard color F09-80D. It has been found that above all, a color difference between the above-mentioned color phase and a color phase exhibited by the standard color F19-50F is smallest.

From the above findings, it can be said that preferably the color phase of the carbonate precursor is in the + direction in all of dL, da and db as compared to the standard color F05-20B, and more preferably dL is +5 or more, da is +2 or more, and db is +5 or more.

By above-described the range of the color phase for precursor, the positive active material has a larger discharge capacity. The positive active material for a nonaqueous electrolyte lithium secondary battery according to the present invention can be suitably prepared by mixing the carbonate precursor and a Li compound, followed by heat-treating the mixture. By using, as the Li compound, lithium hydroxide, lithium carbonate, lithium nitrate, lithium acetate or the like, the active material can be suitably produced. For the amount of the Li compound, however, it is preferable to incorporate the Li compound in an excessive amount by about 1 to 5% in consideration of elimination of a part thereof during sintering.

In the present invention, a Na compound is preferably mixed with the carbonate precursor containing Na, together with a Li compound, in the sintering step for ensuring that the content of Na in the lithium transition metal composite oxide is 3000 ppm or more. The Na compound is preferably sodium carbonate. The content of Na in the carbonate precursor is about 900 to 2100 ppm, but the content of Na can be increased to 3000 ppm or more by mixing a Na compound.

The sintering temperature influences the reversible capacity of the active material.

If the sintering temperature is too high, there is such a tendency that the obtained active material is collapsed with an oxygen release reaction, and a phase defined as a $Li[Li_{1/3}Mn_{2/3}]O_2$ type of a monoclinic crystal, in addition to a hexagonal crystal as a main phase tends to be observed as a separate phase rather than a solid solution phase. Inclusion of this separate phase in a too large amount is not preferable because the reversible capacity of the active material is reduced. In this material, impurity peaks are observed at around 35° and at around 45° on the X-ray diffraction pattern. Therefore, the sintering temperature is preferably lower than a temperature at which the oxygen release reaction of the active material is influential.

On the other hand, if the sintering temperature is too low, there is such a tendency that crystallization does not sufficiently proceed, and the electrode characteristic is degraded. In the present invention, the sintering temperature is preferably at least 700° C. By ensuring sufficient crystallization, the resistance of a crystal grain boundary can be reduced to facilitate smooth transportation of lithium ions.

As described above, the preferred sintering temperature varies depending on the oxygen release temperature of the active material, and it is therefore difficult to uniformly set a preferred range of the sintering temperature, but for making the discharge capacity sufficiently high when the molar ratio of Li/Me is 1.2 to 1.6, the sintering temperature is preferably 700 to 950° C., and more preferably around 800 to 900° C. particularly when Li/Me is 1.25 to 1.4

In the present invention, a carbon material capable of absorbing and releasing lithium ions is used as a negative active material. Here, the carbon material is composed of a mixture of graphite and amorphous carbon, and the ratio of the aforementioned amorphous carbon contained in the carbon material is 5 to 60% by mass.

Amorphous carbon is carbon satisfied at least one of "a crystal structure which does not show an orientation only in a specific monoaxial direction" or "a $d_{(002)}$ determined from the (002) diffraction line in X-ray diffraction measurement is 3.4 Å or more". Specific examples thereof include soft carbon and hard carbon.

In the present invention, use of amorphous carbon having a half width of 6.0° or less, the half width being that of the (002) diffraction line in X-ray diffraction measurement, is preferable because discharge energy of the nonaqueous electrolyte secondary battery can be increased. Further, the half width is preferably 5.1° or less, especially preferably 3.20 or less.

A negative electrode composed of amorphous carbon has a low discharge capacity as compared to a negative electrode composed of graphite, but has a large effect of suppressing deposition of Li during charge. Therefore, by mixing amorphous carbon with graphite to form a negative active material, charge can be performed to a deeper utilization factor of the negative electrode in high-potential formation in an initial charge-discharge step. That is, the discharge capacity of the negative electrode can be made larger by inserting into amorphous carbon an amount of $Li^+$ which corresponds to a difference between a positive electrode capacity during high-potential formation and a positive electrode capacity during actual use.

By mixing amorphous carbon with graphite to form a negative active material, a low SOC region having a high resistance, which is a weak point of the "lithium-excess-type" positive active material, can be cut, leading to the advantage that the low SOC power is improved.

If the ratio of the amorphous carbon contained in the carbon material is less than 5% by mass (the ratio of graphite is more than 95%), deposition of Li occurs on a negative electrode having graphite as a principal component during high-potential formation in an initial charge-discharge step, so that cycle performance is deteriorated, and the low SOC power is not improved. If the ratio of the amorphous carbon contained in the carbon material is more than 60% by mass (the ratio of graphite is less than 40%), the battery capacity is reduced. Therefore, for increasing the battery capacity and improving the low SOC power, the ratio of the amorphous carbon contained in the carbon material is 5 to 60% by mass. For more increasing the battery capacity and improving the low SOC power, the ratio of the amorphous carbon contained in the carbon material is preferably 10 to 50% by mass, more preferably 10 to 30% by mass. Since initial efficiency is significantly improved as the ratio of the amorphous carbon is decreased from 60% by mass or less to 50% by mass or less, further to 30% by mass or less, the aforementioned range is preferable.

It is desirable that the powder of the positive active material and the powder of the negative electrode material have an average particle size of 100 μm or less. Particularly, it is desirable that the powder of the positive active material have a size of 10 μm or less for the purpose of improving the high power characteristics of the nonaqueous secondary electrolyte battery. A crusher and a classifier are used for obtaining a powder in a predetermined shape. For example, a mortar, a ball mill, a sand mill, a vibration ball mill, a planet ball mill, a jet mill, a counter jet mill, a revolving airflow-type jet mill, a sieve or the like is used. At the time of crushing, wet crushing can also be used in which water, or an organic solvent such as hexane coexists. The classification method is not particularly limited, and a sieve, an air classifier or the like is used as necessary in both dry and wet processes.

The positive active material and the negative electrode material which are main components of the positive electrode and the negative electrode have been described in detail above, but the positive electrode and negative electrode may contain, in addition to the main components, a conducting agent, a binder, a thickener, a filler and the like as other components.

The conducting agent is not limited as long as it is an electron-conductive material that has no adverse effect on battery performance, but normally conductive materials such as natural graphite (scaly graphite, flake graphite, earthy graphite, etc.), artificial graphite, carbon black, acetylene black, ketjen black, carbon whisker, carbon fibers, metal (copper, nickel, aluminum, silver, gold, etc.) powders, metal fibers and conductive ceramic materials can be included alone or as a mixture thereof.

Among them, acetylene black is desirable as a conducting agent from the viewpoints of electron conductivity and coating properties. The added amount of the conducting agent is preferably 0.1% by weight to 50% by weight, especially preferably 0.5% by weight to 30% by weight based on the total weight of the positive electrode or negative electrode. Particularly, use of acetylene black crushed into ultrafine particles of 0.1 to 0.5 µm is desirable because the required amount of carbon can be reduced. These mixing methods involve physical mixing, the ideal of which is homogeneous mixing. Thus, mixing can be carried out in a dry process or a wet process using a powder mixer such as a V-type mixer, an S-type mixer, a grinder, a ball mill or a planet ball mill.

As the binder, thermoplastic resins such as polytetrafluoroethylene (PTFE), polyvinylidene fluoride (PVDF), polyethylene and polypropylene, and polymers having rubber elasticity, such as ethylene-propylene-diene terpolymer (EPDM), sulfonated EPDM, styrene-butadiene rubber (SBR) and fluororubber can normally be used alone or as a mixture of two or more thereof. The added amount of the binder is preferably 1 to 50% by weight, especially preferably 2 to 30% by weight based on the total weight of the positive electrode or negative electrode.

The filler may be any material as long as it has no adverse effect on battery performance. An olefin-based polymer such as polypropylene or polyethylene, amorphous silica, alumina, zeolite, glass, carbon or the like is normally used. The added amount of the filler is preferably 30% by weight or less based on the total amount of the positive electrode or the negative electrode.

The positive electrode and the negative electrode are suitably prepared by kneading the aforementioned main components (positive active material in the positive electrode and negative electrode material in the negative electrode) and other materials to form a mixture, and mixing the mixture with an organic solvent, such as N-methylpyrrolidone or toluene, or water, followed by applying or contact-bonding the resulting mixed liquid onto a current collector that is described in detail below, and carrying out a heating treatment at a temperature of about 50° C. to 250° C. for about 2 hours. For the applying method, for example, it is desirable to perform applying in any thickness and any shape using means such as roller coating by an applicator roll or the like, screen coating, a doctor blade system, spin coating or a bar coater, but the applying method is not limited thereto.

The nonaqueous electrolyte used in the nonaqueous electrolyte secondary battery according to the present invention is not limited, and those that are generally proposed to be used in lithium batteries and the like can be used. Examples of the nonaqueous solvent used in the nonaqueous electrolyte may include, but are not limited to, cyclic carbonates such as propylene carbonate, ethylene carbonate, butylene carbonate, chloroethylene carbonate and vinylene carbonate; cyclic esters such as γ-butyrolactone and γ-valerolactone; chain carbonates such as dimethyl carbonate, diethyl carbonate and ethylmethyl carbonate; chain esters such as methyl formate, methyl acetate and methyl butyrate; tetrahydrofuran or derivatives thereof; ethers such as 1,3-dioxane, 1,4-dioxane, 1,2-dimethoxyethane, 1,4-dibutoxyethane and methyl diglyme; nitriles such as acetonitrile and benzonitrile; dioxolane or derivatives thereof; and ethylene sulfide, sulfolane, sultone or derivatives thereof alone or mixtures of two or more thereof. Examples of the electrolyte salt used in the nonaqueous electrolyte include inorganic ion salts including one of lithium (Li), sodium (Na) and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$ and KSCN, and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate and lithium dodecylbenzenesulfonate, and these ionic compounds can be used alone or in combination of two or more thereof.

Further, by mixing $LiPF_6$ or $LiBF_4$ with a lithium salt having a perfluoroalkyl group, such as $LiN(C_2F_5SO_2)_2$, the viscosity of the electrolyte can be further reduced, so that the low-temperature characteristics can be further improved, and self discharge can be suppressed, thus being more desirable.

A salt that is melted at ordinary temperature or an ion liquid may be used as a nonaqueous electrolyte.

The concentration of the electrolyte salt in the nonaqueous electrolyte is preferably 0.1 mol/l to 5 mol/l, further preferably 0.5 mol/l to 2.5 mol/l for reliably obtaining a nonaqueous electrolyte secondary battery having high battery characteristics.

As a separator, it is preferable that a porous membrane, a nonwoven fabric or the like, which shows excellent high rate discharge performance, be used alone or in combination. Examples of the material that forms the separator for a nonaqueous electrolyte secondary battery may include polyolefin-based resins represented by polyethylene, polypropylene and the like, polyester-based resins represented by polyethylene terephthalate, polybutylene terephthalate and the like, polyvinylidene fluoride, vinylidene fluoride-hexafluoropropylene copolymers, vinylidene fluoride-perfluoro vinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers and vinylidene fluoride-ethylene-tetrafluoroethylene copolymers.

The porosity of the separator is preferably 98% by volume or less from the viewpoint of the strength. The porosity is preferably 20% by volume or more from the viewpoint of charge-discharge characteristics.

For the separator, for example, a polymer gel formed of acrylonitrile, ethylene oxide, propylene oxide, methyl methacrylate, vinyl acetate, vinyl pyrrolidone or a polymer such as poly(fluoride vinylidene) and an electrolyte may be used. Use of the nonaqueous electrolyte in a gel form as described above is preferable from the viewpoint of being effective to prevent liquid leakage.

Further, for the separator, use of the porous membrane, nonwoven fabric or the like in combination with the polymer gel is desirable because liquid retainability of the electrolyte is improved. That is, a film with the surface and the microporous wall face of a polyethylene microporous membrane coated with a solvophilic polymer in a thickness of several m or less is formed, and an electrolyte is held within micropores of the film, so that the solvophilic polymer is formed into a gel.

Examples of the solvophilic polymer include, in addition to poly(fluoride vinylidene), polymers in which an acrylate monomer having an ethylene oxide group, an ester group or the like, an epoxy monomer, a monomer having an isocyanate group, or the like is crosslinked. The monomer can be subjected to a crosslinking reaction by carrying out heating or using ultraviolet rays (UV) while using a radical initiator at the same time, or using active light rays such as electron beams (EB), or the like.

The configuration of the nonaqueous electrolyte secondary battery according to the present is not particularly limited, and examples thereof include a cylindrical battery having a positive electrode, a negative electrode and a roll-shaped separator, a prismatic battery and a flat battery.

Both the conventional positive active material and the active material using the nonaqueous electrolyte secondary battery according to the present invention are capable of charge-discharge at a positive electrode potential of around 4.5 V (vs. Li/Li$^+$). However, depending on the type of using nonaqueous electrolyte, the nonaqueous electrolyte may be oxidatively decomposed to cause deterioration of battery performance because the positive electrode potential during charge is too high. A nonaqueous electrolyte secondary battery, with which a sufficient discharge capacity is obtained even when such a charge method that the maximum potential of the positive electrode during charge is 4.3 V (vs. Li/Li$^+$) or less is employed at the time of operation, may be required. If the active material using the nonaqueous electrolyte secondary battery of the present invention is used, a discharge electrical amount, which exceeds the capacity of the conventional positive active material, i.e., about 200 mAh/g, can be obtained even when such a charge method that the maximum potential of the positive electrode during charge is lower than 4.5 V (vs. Li/Li$^+$), for example, 4.4 (vs. Li/Li$^+$) or less or 4.3 (vs. Li/Li$^+$) or less is employed at the time of user operation.

For the positive active material using the nonaqueous electrolyte secondary battery, according to the present invention to have a high discharge capacity, the ratio, at which transition metal elements that form a lithium-transition metal composite oxide are present in areas other than transition metal sites of a layered rock-salt-type crystal structure, is preferably low. This can be achieved by ensuring that in precursor particles that are subjected to a sintering step, transition metal elements such as Co, Ni and Mn in precursor core particles are sufficiently homogeneously distributed, and selecting suitable conditions for the sintering step for promoting crystallization of an active material. If distribution of transition metals in precursor core particles that are subjected to the sintering step is not homogeneous, a sufficient discharge capacity is not obtained. The reason for this is not necessarily clear, but the present inventors infer that this results from occurrence of so called cation mixing in which the obtained lithium-transition metal composite oxide has some of transition metal elements present in areas other than transition metal sites of the layered rock-salt-type crystal structure, i.e., lithium sites if the distribution of transition metals in precursor core particles that are subjected to the sintering step is not homogeneous. A similar inference can be applied in a crystallization process in the sintering step, wherein cation mixing in the layered rock-salt-type crystal structure easily occurs if crystallization of the active material is insufficient. Those in which the homogeneity of the distribution of the transition metal elements is high tend to have a high intensity ratio of diffraction peaks of the (003) line and the (104) line when the result of X-ray diffraction measurement is attributed to a space group R3-m. In the present invention, the intensity ratio of diffraction peaks of the (003) line and the (104) line from X-ray diffraction measurement is preferably $I_{(003)}/I_{(104)} \geq 1.0$. The intensity ratio is preferably $I_{(003)}/I_{(104)} > 1$ in a state of complete discharge after charge-discharge. If synthesis conditions and synthesis procedures for the precursor are inappropriate, the peak intensity ratio is a smaller value, which is often less than 1.

By employing the synthesis conditions and synthesis procedures described in the specification of the present application, a positive active material having high performance as described above can be obtained. Particularly, there can be provided a positive active material for a nonaqueous electrolyte secondary battery with which a high discharge capacity can be obtained even when the charge upper limit potential of positive electrode is set to lower than 4.5, e.g., a charge upper limit potential such as 4.4 V or 4.3 V is set.

For producing a nonaqueous electrolyte secondary battery capable of securing a sufficient discharge capacity even if the foregoing "positive active material which contains a lithium transition metal composite oxide having an α-NaFeO$_2$-type crystal structure and represented by the composition formula: Li$_{1+x}$Me$_{1-x}$O$_2$ (wherein Me is a transition metal element including Co, Ni and Mn; and α>0), wherein the molar ratio of Li to the transition metal element Me (Li/Me) is 1.2 to 1.6", is used, and such a charge method that the maximum ultimate potential of a positive electrode during charge is 4.3 V (vs. Li/Li$^+$) or less during use of the battery is employed, it is preferred that a charge step (high-potential formation) taking into consideration a behavior characteristic to the above-mentioned positive active material as described below is provided in an initial charge-discharge step, one of the steps of the production process of the nonaqueous electrolyte secondary battery. That is, when constant current charge is continued using this active material for the positive electrode, a region where a potential change is relatively flat with respect to an amount of charge is observed for a relatively long period of time in a positive electrode potential range of 4.3 V to 4.8 V. FIG. 1 shows a positive electrode potential behavior when charge is first performed to a positive electrode using a positive active material prepared in Example 1. As seen in FIG. 1, a region where a potential change is relatively flat at a potential of around 4.45 V as compared to a potential of around 4.00 V is observed for a long period of time from around the time when the amount of charge exceeds 100 mAh/g during charge in high-potential formation.

In the charge step, a charge capacity per negative active material is preferably 372 mAh/g or more.

The theoretical insertion capacity of Li in graphite (theoretical charge capacity) is 372 mAh/g. Therefore, if charge exceeding the theoretical capacity is performed, a phenomenon of deposition of a Li metal may occur, leading to deterioration of life characteristics such as cycle performance and heat stability.

On the other hand, amorphous carbon has a charge capacity of more than 372 mAh/g, so that Li can be inserted without deposition of a Li metal even in the charge described above.

Therefore, by adding amorphous carbon to graphite, the charge capacity of the negative electrode can be increased during high-potential formation, so that the utilization factor of the negative electrode can be considerably enhanced. Accordingly, the capacity of the battery can be enhanced while cycle performance and the like are maintained.

These effects particularly effectively act when charge that is equal to or more than the theoretical charge capacity of graphite is performed, thus making it possible to achieve a battery having high performance that cannot be attained by conventional graphite negative electrodes.

Example 1

Example 1-1

Preparation of Positive Active Material

Cobalt sulfate heptahydrate (14.06 g), nickel sulfate hexahydrate (20.97 g) and manganese sulfate pentahydrate (65.15 g) were weighed, and totally dissolved in 200 ml of ion exchange water to prepare a 2 M aqueous sulfate solution in which the molar ratio of Co:Ni:Mn was 0.125:0.199:0.676. 750 ml of ion exchange-water was poured into a 2 dm$^3$ reaction tank, and a $CO_2$ gas was bubbled for 30 min to thereby dissolve the $CO_2$ gas in ion exchange water. The temperature of the reaction tank was set at 50° C. (±2° C.), and the aqueous sulfate solution was added dropwise at a rate of 3 ml/min while the contents in the reaction tank was stirred at a rotation speed of 700 rpm using a paddle impeller equipped with a stirring motor. The control was performed so that pH in the reaction tank was kept at 7.9 (±0.05) by appropriately adding dropwise an aqueous solution containing 2.00 M sodium carbonate and 0.20 M ammonia during dropwise addition of the aqueous sulfate solution. After completion of dropwise addition, stirring the contents in the reaction tank was continued for further 1 h. After stirring was stopped, the reaction tank was left standing for 12 h or more. By leaving standing the reaction tank, particles of a coprecipitation carbonate generated in the reaction tank can be sufficiently grown. Next, particles of a coprecipitation carbonate generated in the reaction tank were separated using a suction filtration device. Sodium ions attached on the particles were further washed off under conditions of performing washing five times, with one-time washing including performing washing using 200 ml of ion exchange water. The particles were dried at 80° C. for 20 hours under normal pressure in an air atmosphere using an electric furnace. Thereafter, the particles were crushed over a few minutes by an automatic mortar made of agate for equalizing the particle size. In this way, a coprecipitation carbonate precursor was prepared.

For the resulting coprecipitation carbonate precursor, the color phase was measured using Color Reader CR10 manufactured by KONICA MINOLTA, and the results were dL=+8, da=+4 and db=+8 with respect to standard color F05-20B of Standard Paint Colors (JPMA Standard Paint Colors) (Edition F, 2011) conforming to JIS Z 8721 and issued by Japan Paint Manufacturers Association.

Lithium carbonate (0.970 g) was added to the coprecipitation carbonate precursor (2.278 g), and the mixture was adequately mixed using an automatic mortar made of agate to prepare a mixed powder of which the molar ratio of Li:(Co, Ni, Mn) was 1.30:1.00. The powder was molded at a pressure of 6 MPa using a pellet molding machine to form a pellet having a diameter of 25 mm. The amount of the mixed powder subjected to pellet molding was determined by performing conversion calculation so that the mass as an expected final product would be 2 g. One of the pellets was placed in an alumina boat having a total length of about 100 mm, the boat was placed in a box-type electric furnace (model: AMF 20), the temperature was elevated from ordinary temperature to 900° C. under normal pressure in an air atmosphere over 10 hours, and the pellet was sintered at 900° C. for 4 h. The box-type electric furnace had an internal dimension of 10 cm (height), 20 cm (width) and 30 cm (depth), and provided with electrically heated wires at intervals of 20 cm in the width direction. After calcination, a heater was switched off, the alumina boat was naturally cooled as it was left standing in the furnace. As a result, the temperature of the furnace decreased to about 200° C. after 5 hours, but the subsequent temperature fall rate was slightly low. After elapse of a whole day and night, the pellet was taken out after confirming that the temperature of the furnace was not higher than 100° C., and crushed by an automatic mortar made of agate for equalizing the particle size. In this way, a lithium transition metal composite oxide $Li_{1.13}Co_{0.11}Ni_{0.17}Mn_{0.59}O_2$ containing Na (2100 ppm) according to Example 1-1 was prepared.

(Measurement of Particle Size)

For the lithium transition metal composite oxide according to Example 1-1, particle size distribution measurements were made in accordance with the following conditions and procedure. Microtrac (model: MT 3000) manufactured by Nikkiso Co., Ltd. was used as a measuring apparatus. The measuring apparatus includes an optical stage, a sample supply section and a computer including control software, and a wet cell having a laser light transmission window is placed on the optical stage. For the measurement principle, a wet cell, through which a dispersion with a measurement object sample dispersed in a dispersive solvent is circulated, is irradiated with laser light, and a distribution of scattered light from the measurement sample is converted into a particle size distribution. The dispersion is stored in a sample supply section, and cyclically supplied to the wet cell by a pump. The sample supply section constantly receives ultrasonic vibrations. In this measurement, water was used as a dispersive solvent. Microtrac DHS for Win 98 (MT 3000) was used as measurement control software. For "substance information" set and input in the measuring apparatus, a value of 1.33 was set as the "refractive index" of the solvent, "Transparent" was selected as the "transparency", and "Nonspherical" was selected as the "spherical particle". A "Set Zero" operation is performed prior to measurement of the sample. The "Set Zero" operation is an operation for subtracting influences on subsequent measurements of disturbance factors (glass, contamination of the glass wall face, glass irregularities, etc.) other than scattered light from particles, wherein only water as a dispersive solvent is fed in a sample supply section, a background operation is performed with only water as a dispersive solvent being circulated through a wet cell, and background data is stored in a computer. Subsequently, a "Sample LD (Sample Loading)" operation is performed. The Sample LD operation is an operation for optimizing the concentration of a sample in a dispersion that is cyclically supplied to a wet cell during measurement, wherein a measurement object sample is manually introduced into a sample supply section in accordance with instructions of measurement control software until an optimum amount is reached. Subsequently, a "measurement" button is depressed, so that a measurement operation is performed. The measurement operation is repeated twice and as an average thereof, a measurement result is output from a computer. The measurement result is acquired as a particle size distribution histogram, and the values of D10, D50 and D90 (D10, D50 and D90 are particle sizes at which the cumulative volume in the particle size distribution of secondary particles is 10%, 50% and 90%, respectively. Value of D50 measured was 5 μm.

(Pore Volume Distribution Measurement)

For the lithium transition metal composite oxide according to Example 1-1, pore volume distribution measurements were made in accordance with the following conditions and procedure. For measurement of the pore volume distribution, "Autosorb iQ" and control/analysis software "ASiQwin" manufactured by Quantachrome Instruments were used. A lithium transition metal composite oxide (1.00 g) as a sample to be measured was placed in a sample tube for measurement, and vacuum-dried at 120° C. for 12 h to sufficiently remove moisture in the measurement sample. Next, by a nitrogen gas adsorption method using liquid nitrogen, isotherms on the adsorption side and the desorption side were measured at a relative pressure P/PO (PO=about 770 mmHg) ranging from 0 to 1. Then, a pore distribution was evaluated by performing a calculation by BJH method using the isotherm on the desorption side.

In the lithium transition metal composite oxide according to Example 1-1, the pore sizes, at which the differential pore volume determined by BJH method from an adsorption isotherm obtained using a nitrogen gas adsorption method shows a maximum value, were in a range of 30 to 40 nm, and the peak differential pore volume was 1.39 mm$^3$/(g·nm).

(Configuration of Battery)

The lithium transition metal composite oxide prepared as described above was used as a positive active material for a nonaqueous electrolyte secondary battery to prepare a non-aqueous electrolyte secondary battery in accordance with the following procedure.

(Positive Electrode)

A applying paste was prepared in which a positive active material, acetylene black (AB) and polyvinylidene fluoride (PVdF) were mixed at a mass ratio of 90:5:5 and dispersed with N-methylpyrrolidone as a dispersion medium. The applying paste was applied to one surface of an aluminum foil current collector having a thickness of 20 μm and dried to prepare a positive electrode plate. The mass of the active material applied per unit area was 5 mg/cm$^2$. Pressing was performed using a roll press so that the porosity of the electrode was 35%.

(Negative Electrode)

A applying paste was prepared in which an active material formed by mixing graphite and amorphous carbon at a mass ratio of 95:5 and polyvinylidene fluoride (PVdF) were mixed at a mass ratio of 94:6 and dispersed with N-methylpyrrolidone as a dispersion medium. The applying paste was applied to one surface of a copper foil current collector having a thickness of 20 μm and dried to prepare a negative electrode plate.

SFG 15 manufactured by TIMCAL Ltd. was used for graphite as a negative active material, and CARBOTRON P (hard carbon) manufactured by KUREHA CORPORATION was used for amorphous carbon.

The mass of the active material applied per unit area was 4 mg/cm$^2$. Pressing was performed using a roll press so that the porosity of the electrode was 35%.

(Thicknesses of Positive Electrode and Negative Electrode)

In the nonaqueous electrolyte secondary batteries of Examples 1-1 to 1-7 and Comparative Examples 1-1 to 1-5, the sum of electrode thickness of the positive electrode and the negative electrode was fixed to 92 μm.

(Assembly of Battery)

As an electrolyte solution, a solution obtained by dissolving LiPF$_6$, in a concentration of 1 mol/l, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. Further, a bar formed by bonding a lithium metal foil to a nickel plate was placed as a reference electrode. As a sheath, a metal resin composite film made of polyethylene terephthalate (15 μm)/aluminum foil (50 μm)/metal-adhesive polypropylene film (50 μm) was used. The electrode was stored such that the open ends of a positive electrode terminal, a negative electrode terminal and a reference electrode terminal were externally exposed. Fusion margins with the inner surfaces of the aforementioned metal resin composite films facing each other were airtightly sealed except a portion forming an electrolyte solution filling hole. The electrolyte solution was injected, followed by sealing the electrolyte solution filling hole.

(Initial Charge-Discharge Step (High-Potential Formation))

Figure 2:
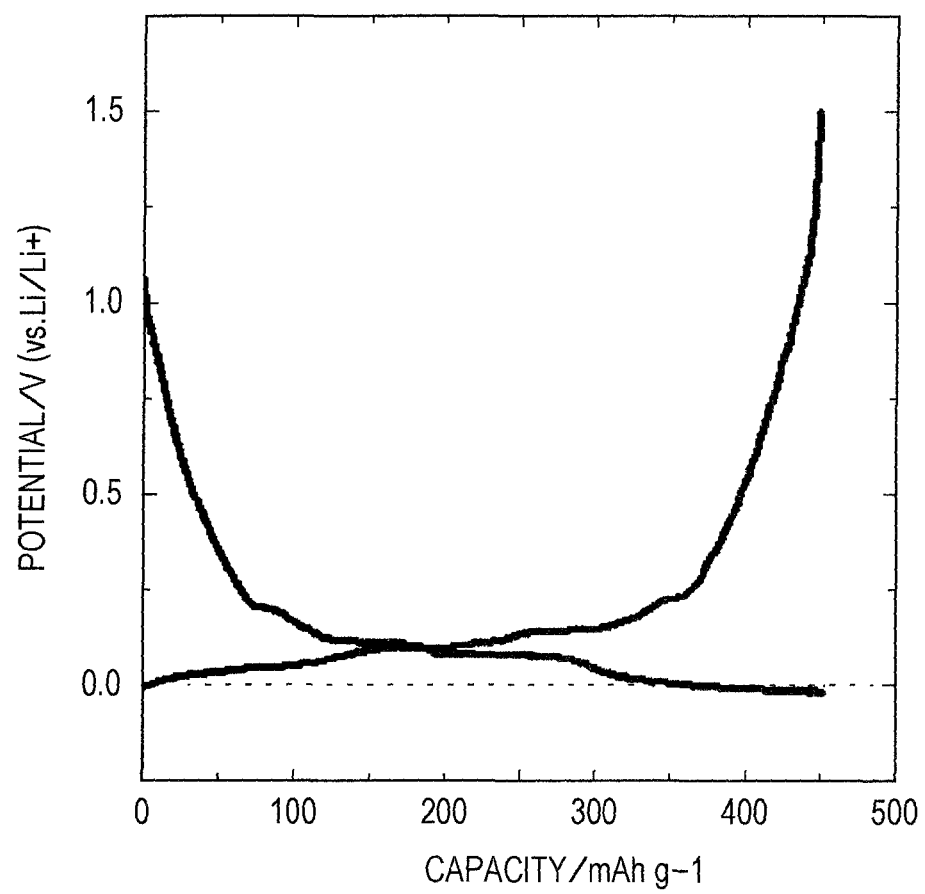
FIG. 2 is a view showing a potential behavior of a negative electrode having a negative active material containing a mixture of graphite and amorphous carbon.
Figure 3:
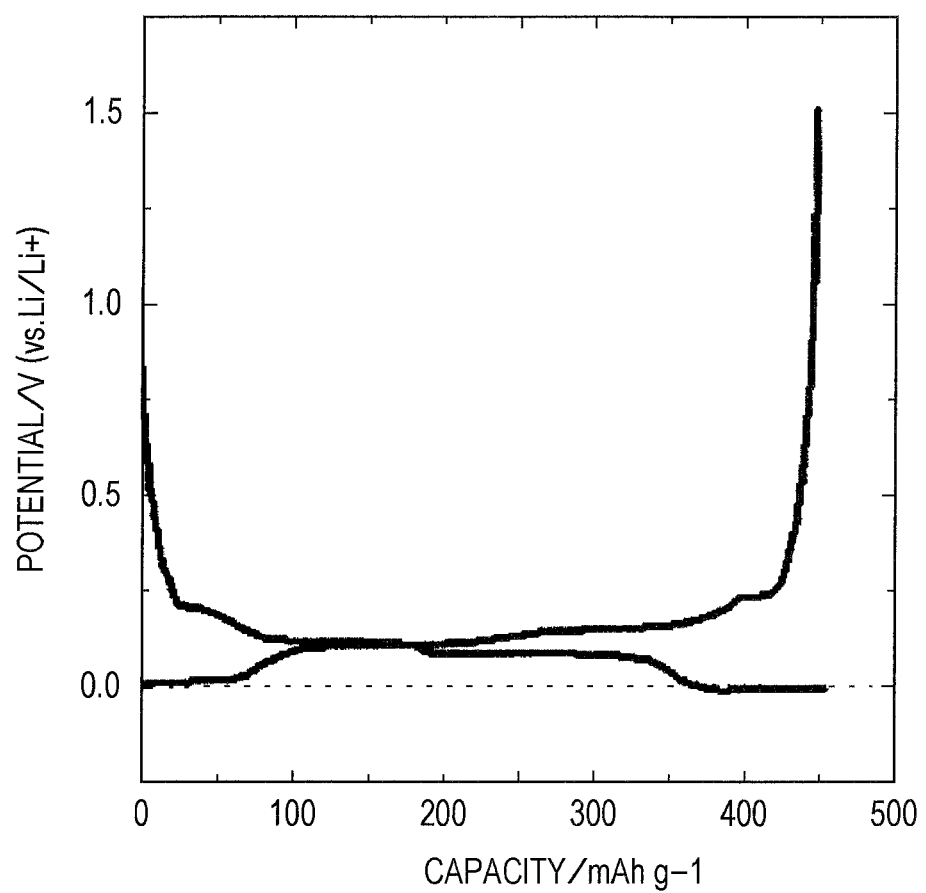
FIG. 3 is a view showing a potential behavior of a negative electrode having a negative active material composed of graphite.

In the battery assembled in the manner described above, initial charge was performed so that an amount of electricity per positive active material was 320 mAh/g while an amount of electricity per negative active material was 400 mAh/g. The charge was constant current charge with a charge current of 0.1 CmA. After 10 minutes of rest, constant current discharge with a discharge current of 0.1 CmA and a final voltage of 2.0 V was performed. The environmental temperature of initial charge-discharge step was 25° C. The ratio of a discharge capacity to a charge capacity at this time is "initial efficiency". In a behavior of the negative electrode potential monitored with respect to the reference electrode at the same time, a battery, in which a region where a potential change was flat (potential plateau) was not observed at around 0 V (vs. Li/Li$^+$) in the initial stage of discharge as shown in FIG. 2, is considered to have no electrodeposition (phenomenon of deposition of lithium metal on negative electrode) and rated "◯", and a battery, in which a potential plateau was observed as shown in FIG. 3, is considered to have electrodeposition and rated "x".

In this way, the nonaqueous electrolyte secondary battery according to Example 1-1 was prepared.

Examples 1-2 to 1-7

Nonaqueous electrolyte secondary batteries according to Examples 1-2 to 1-7 were prepared in the same manner as in Example 1-1 except that the mass ratio of graphite and amorphous carbon was changed from 95:5 to the values described in Table 1.

Comparative Example 1-1

A nonaqueous electrolyte secondary battery according to Comparative Example 1-1 was prepared in the same manner as in Example 1-1 except that a mixture of graphite and amorphous carbon was changed to graphite alone.

Comparative Example 1-2

A nonaqueous electrolyte secondary battery according to Comparative Example 1-2 was prepared in the same manner as in Example 1-1 except that a mixture of graphite and amorphous carbon was changed to graphite alone, and conditions for the above-described initial charge-discharge step (high-potential formation) were changed to the following conditions under which electrodeposition (phenomenon of deposition of lithium metal on negative electrode) would not occur.
(Initial Charge-Discharge Step (High-Potential Formation))

Constant current constant voltage charge with a current of 0.1 CmA and a voltage of 4.5 V was performed. The charge termination condition was set at a time point at which the current value decreased to 0.02 CmA. Further, after 10 minutes of rest, constant current discharge with a current of 0.1 CmA and a final voltage of 2.0 V was performed. The environmental temperature of the initial charge-discharge step was 25° C. The ratio of a discharge capacity to a charge capacity at this time is "initial efficiency". In a behavior of the negative electrode potential monitored with respect to the reference electrode at the same time, a potential plateau was not observed at around 0 V in the initial stage of discharge, and therefore the battery according to Comparative Example 1-2 was confirmed to have no electrodeposition.

Comparative Example 1-3

A nonaqueous electrolyte secondary battery according to Comparative Example 1-3 was prepared in the same manner as in Example 1-1 except that a mixture of graphite and amorphous carbon was changed to amorphous carbon alone.

Comparative Example 1-4

A nonaqueous electrolyte secondary battery according to Comparative Example 1-4 was prepared in the same manner as in Example 1-1 except that the mass ratio of graphite and amorphous carbon was changed from 95:5 to 98:2.

Comparative Example 1-5

A nonaqueous electrolyte secondary battery according to Comparative Example 1-5 was prepared in the same manner as in Example 1-1 except that the mass ratio of graphite and amorphous carbon was changed from 95:5 to 30:70.

Comparative Examples 1-6 and 1-7

A positive electrode was prepared in the same manner as in Example 1-1 except that GNCM01 (manufactured by NIHON KAGAKU SANGYO CO., LTD.) having a composition of $LiCo_{1/3}Ni_{1/3}Mn_{1/3}O_2$ was used as a positive active material in place of $Li_{1.13}Co_{0.11}Ni_{0.17}Mn_{0.59}O_2$, and a change was made so that the mass of an active material applied per unit area of the positive electrode was 8.4 $mg/cm^2$. Except that conditions for the initial charge-discharge step were changed to the following conditions as for matters other than the positive electrode, a nonaqueous electrolyte secondary battery according to Comparative Example 1-6 was prepared in the same manner as in Comparative Example 1-1, and a nonaqueous electrolyte secondary battery according to Comparative Example 1-7 was prepared in the same manner as in Example 1-2.
(Initial Charge-Discharge Step)

Initial charge was performed so that an amount of electricity per positive active material was 155 mAh/g while an amount of electricity per negative active material was 327 mAh/g. The charge was constant current charge with a charge current of 0.1 CmA. After 10 minutes of rest, constant current discharge with a discharge current of 0.1 CmA and a final voltage of 2.0 V was performed. The environmental temperature during charge/discharge was 25° C. The ratio of a discharge capacity to a charge capacity at this time is "initial efficiency". In a behavior of the negative electrode potential monitored with respect to the reference electrode at the same time, a potential plateau was not observed at around 0 V in the initial stage of discharge, and therefore these batteries were confirmed to have no electrodeposition.
<Battery Test>
(Battery Capacity)

After the initial charge-discharge step, the batteries of Examples 1-1 to 1-7 and Comparative Examples 1-1 to 1-7 were subjected to constant current constant voltage charge with a current of 0.1 CmA and a voltage of 4.2 V after 10 minutes of rest. The charge termination condition was set at a time point at which the current value decreased to 0.02 CmA. Further, after 10 minutes of rest, constant current discharge with a current of 0.1 CmA and a final voltage of 2.0 V was performed, and the discharge capacity at this time was defined as a "battery capacity (mAh)". The environmental temperature during charge/discharge was 25° C.
(Low SOC Power)

Further, after 10 minutes of rest, constant current constant voltage charge with a current of 0.1 CmA and a voltage of 4.2 V was performed. The charge termination condition was set at a time point at which the current value decreased to 0.02 CmA. After 10 minutes of rest, a current was passed in an electricity amount of 70% of the value of the aforementioned "battery capacity (mAh)", and at this time point, discharge was stopped. Thereafter, a test of performing discharge for 1 second at each rate of discharge current was conducted. Specifically, first, discharge was performed at a current of 0.1 CmA for 1 second, and after 2 minutes of rest, auxiliary charge was performed at a current of 0.1 CmA for 1 second. Further, after 2 minutes of rest, discharge was performed at a current of 1 CmA for 1 second, and after 2 minutes of rest, auxiliary charge was performed at a current of 0.1 CmA for 10 seconds. Further, after 2 minutes of rest, discharge was performed at a current of 2 CmA for 1 second, and after 2 minutes of rest, auxiliary charge was performed at a current of 0.1 CmA for 20 seconds. From the intercept and gradient of a graph obtained by plotting a voltage 1 second after each rate of discharge against a current value thereof from the result of the test described above, and performing fitting by a least square method, a direct current resistance R and E0, i.e. a pseudo voltage value of a discharge current 0 CA were each calculated. A power at SOC 30% was determined from the following formula on the assumption that the end-of-discharge voltage was 2.5 V. The power at this time was recorded as a "low SOC power (W)".

Low SOC power$(W)=2.5\times(E0-2.5)/R$

The environmental temperature of this test was 25° C.
(Cycle Capacity Retention Ratio)

Further, after 10 minutes of rest, constant current constant voltage charge with a current of 1 CmA and a voltage of 4.2

V was performed. The charge termination condition was set at a time point at which the current value decreased to 0.02 CmA. After 10 minutes of rest, constant current discharge with a current of 0.1 CmA and a final voltage of 2.0 V was performed, followed by 10 minutes of rest. These operations were all performed under an environment at 25° C. With this series of processes as one cycle, the ratio of a discharge capacity obtained at the 15th cycle to a discharge capacity obtained at the 1st cycle was recorded as a "cycle capacity retention ratio".

The test results for the nonaqueous electrolyte secondary batteries according to Examples 1-1 to 1-7 and Comparative Examples 1-1 to 1-7 are shown in Table 1.

SOC power is reduced (Comparative Example 1-4). In the case where a negative active material in which the ratio of the amorphous carbon is 70% by mass is used, the low SOC power is improved, but the battery capacity is reduced, and initial efficiency is deteriorated (Comparative Example 1-5).

Therefore, for increasing the battery capacity and improving the low SOC power in a nonaqueous electrolyte secondary battery using a "lithium-excess-type" positive active material, it is necessary to use as a negative active material a carbon material in which the ratio of the amorphous carbon contained in a mixture of graphite and amorphous carbon is 5 to 60% by mass.

TABLE 1

| | Positive electrode | Negative electrode | Ratio of graphite | Ratio of amorphous carbon | Initial efficiency | Electrodeposition | Battery capacity (mAh) | 1 CmA cycle retention ratio | Low SOC power (W) |
|---|---|---|---|---|---|---|---|---|---|
| Example 1-1 | $Li_{1+\alpha}Me_{1-\alpha}O_2$ | Graphite/amorphous carbon | 95 | 6 | 92.3% | ○ | 22.4 | 96% | 17 |
| Example 1-2 | $Li_{1+\alpha}Me_{1-\alpha}O_2$ | Graphite/amorphous carbon | 90 | 10 | 90.7% | ○ | 22.4 | 95% | 20 |
| Example 1-3 | $Li_{1+\alpha}Me_{1-\alpha}O_2$ | Graphite/amorphous carbon | 80 | 20 | 88.3% | ○ | 22.2 | 96% | 21 |
| Example 1-4 | $Li_{1+\alpha}Me_{1-\alpha}O_2$ | Graphite/amorphous carbon | 70 | 30 | 87.0% | ○ | 21.5 | 96% | 22 |
| Example 1-5 | $Li_{1+\alpha}Me_{1-\alpha}O_2$ | Graphite/amorphous carbon | 60 | 40 | 84.8% | ○ | 20.7 | 96% | 23 |
| Example 1-6 | $Li_{1+\alpha}Me_{1-\alpha}O_2$ | Graphite/amorphous carbon | 50 | 50 | 82.5% | ○ | 20.1 | 96% | 24 |
| Example 1-7 | $Li_{1+\alpha}Me_{1-\alpha}O_2$ | Graphite/amorphous carbon | 40 | 60 | 78.6% | ○ | 18.9 | 96% | 24 |
| Comparative Example 1-1 | $Li_{1+\alpha}Me_{1-\alpha}O_2$ | Graphite | 100 | 0 | 93.0% | x | 22.5 | 65% | 15 |
| Comparative Example 1-2 | $Li_{1+\alpha}Me_{1-\alpha}O_2$ | Graphite | 100 | 0 | 93.0% | ○ | 18.4 | 95% | 16 |
| Comparative Example 1-3 | $Li_{1+\alpha}Me_{1-\alpha}O_2$ | Amorphous carbon | 0 | 100 | 65.0% | ○ | 15.0 | 96% | 26 |
| Comparative Example 1-4 | $Li_{1+\alpha}Me_{1-\alpha}O_2$ | Graphite/amorphous carbon | 98 | 2 | 92.6% | x | 22.5 | 67% | 16 |
| Comparative Example 1-5 | $Li_{1+\alpha}Me_{1-\alpha}O_2$ | Graphite/amorphous carbon | 30 | 70 | 74.2% | ○ | 18.1 | 96% | 25 |
| Comparative Example 1-6 | $LiMeO_2$ | Graphite | 100 | 0 | 92.8% | ○ | 17.5 | 98% | 35 |
| Comparative Example 1-7 | $LiMeO_2$ | Graphite/amorphous carbon | 90 | 10 | 90.7% | ○ | 17.2 | 98% | 32 |

From Table 1, it is apparent that in the case of nonaqueous electrolyte secondary batteries of Examples 1-1 to 1-7 using in combination a positive active material containing a lithium transition metal composite oxide represented by the composition formula: $Li_{1+\alpha}Me_{1-\alpha}O_2$ (wherein Me is a transition metal element including Co, Ni and Mn; and α>0) and a negative active material which contains a carbon material that is a mixture of graphite and amorphous carbon and in which the ratio of the amorphous carbon contained in the carbon material is 5 to 60% by mass, even if high-potential formation is performed, deposition of Li does not occur on the negative electrode, the battery capacity is as large as about 19 mAh or more, and the low SOC power is improved to the extent of 17 W or more. When the ratio of the amorphous carbon is 10 to 50% by mass, the battery capacity becomes 20 mAh or more, the low SOC power becomes 20 W or more, and initial efficiency is improved to 82.5% or more, and therefore the ratio of the amorphous carbon is preferably in the above-mentioned range. Particularly, the ratio of the amorphous carbon is more preferably 10 to 30% by mass because the battery capacity becomes 21.5 mAh or more, and initial efficiency becomes 87%.

On the other hand, in the case where a negative active material in which the ratio of the amorphous carbon contained in a mixture of graphite and amorphous carbon is 2% by mass is used, when high-potential formation is performed, deposition of Li occurs on the negative electrode, cycle performance is significantly deteriorated and the low In the case of a nonaqueous electrolyte secondary battery using in combination a positive active material which contains a lithium transition metal composite oxide represented by the composition formula: $Li_{1+\alpha}Me_{1-\alpha}O_2$ (wherein Me is a transition metal element including Co, Ni and Mn; and α>0) and having a Li/Me ratio of 1.3 and a negative active material composed of graphite, when high-potential formation is performed, deposition of Li occurs on the negative electrode, cycle performance is significantly deteriorated, and the low SOC power is reduced (Comparative Example 1-1). When the condition in initial formation is changed to the electrodeposition of Li does not occur, deposition of Li does not occur on the negative electrode, but the battery capacity is reduced, and the low SOC power is reduced (Comparative Example 1-2).

On the other hand, in the case of a nonaqueous electrolyte secondary battery using in combination the aforementioned positive active material and a negative active material composed of amorphous carbon, the low SOC power is improved, but the battery capacity is significantly reduced, and initial efficiency is significantly deteriorated (Comparative Example 1-3).

Nonaqueous electrolyte secondary batteries using a "lithium-excess-type" positive active material have been discussed above, and nonaqueous electrolyte secondary batteries using a "$LiMeO_2$-type" positive active material can be as described below.

In the case of a nonaqueous electrolyte secondary battery using in combination a "$LiMeO_2$-type" positive active material and a negative active material composed of graphite, the battery capacity is small (17.5 mAh), but the low SOC power is high (35 W) as shown in Comparative Example 1-6. Here, even if the positive active material is combined with a negative active material formed by mixing amorphous carbon with graphite (mass ratio of graphite:amorphous carbon=90:10), there is little change in battery capacity (17.2 mAh) and the low SOC power is not improved (32 W) as shown in Comparative Example 1-7.

Therefore, the effect of improving a low SOC power by combination with a negative active material formed by mixing amorphous carbon with graphite can be considered to be specific to a nonaqueous electrolyte secondary battery using "lithium-excess-type" positive active material.

In this Example, the initial charge-discharge step includes only one cycle, but a plurality of cycles may be performed. At this time, high-potential formation may be applied for all of the plurality of cycles, or high-potential formation may be applied for only some of the plurality of cycles. In other words, high-potential formation should be employed for at least one cycle in the initial charge-discharge step.

It is not necessary that high-potential formation be performed at the time of initial charge-discharge of the battery, and high-potential formation may be performed at any time during the initial charge-discharge step. In this case, the above-mentioned "initial efficiency" corresponds to a ratio of a discharge capacity to an amount of charge in a cycle in which high-potential formation is first performed (charge-discharge efficiency).

Example 2

In this Example, experiments were conducted while the ratio of amorphous carbon contained in a mixture of graphite and amorphous carbon, i.e. a negative active material was fixed to 10% by mass or 50% by mass, and crystallinity of amorphous carbon was changed. Crystallinity of amorphous carbon was estimated from the half width of X-ray diffraction data for soft carbon, soft carbon after ball-milling treatment, hard carbon and hard carbon after ball-milling treatment, which were used in Examples shown below.

Example 2-1

A nonaqueous electrolyte secondary battery according to Example 2-1 was prepared in the same manner as in Example 1-2 (the ratio of amorphous carbon contained in a mixture of graphite and amorphous carbon was 10% by mass) except that as a negative active material, SFG 15 manufactured by TIMCAL Ltd. was used for graphite and soft carbon (S001-14C3 manufactured by Hitachi Chemical Company, Ltd.) was used for amorphous carbon.

Examples 2-2 to 2-4

Soft carbon identical to that in Example 2-1 was used, and the following milling step (ball-milling treatment) was added. Nonaqueous electrolyte secondary batteries according to Examples 2-2 to 2-4 were prepared in the same manner as in Example 2-1 except that a powder of soft carbon was put beforehand in an alumina pot including 10 alumina balls having a diameter of 10 mm, the pot was set in a planetary ball mill (pulverisette 5 manufactured by FRITSCH Company), and milling was performed at 350 rpm for 1 hour for Example 2-2, for 2 hours for Example 2-3 and for 5 hours for Example 2-4.

Example 2-5

A nonaqueous electrolyte secondary battery according to Example 2-5 was prepared in the same manner as in Example 1-2 using hard carbon identical to that in Example 1-2.

Comparative Examples 2-1 and 2-2

Nonaqueous electrolyte secondary batteries according to Comparative Examples 2-1 and 2-2 were prepared in the same manner as in Example 2-5 except that a powder of hard carbon was put beforehand in an alumina pot including 10 alumina balls having a diameter of 10 mm, the pot was set in a planetary ball mill (pulverisette 5 manufactured by FRITSCH Company), and milling was performed at 350 rpm for 2 hours for Comparative Example 2-1 and for 5 hours for Comparative Example 2-2.

Example 2-6

A nonaqueous electrolyte secondary battery according to Example 2-6 was prepared in the same manner as in Example 2-1 except that the ratio of soft carbon contained in a mixture of graphite and soft carbon was 50% by mass.

Examples 2-7 to 2-9

Nonaqueous electrolyte secondary batteries according to Examples 2-7 to 2-9 were prepared in the same manner as in Example 2-6 except that a powder of soft carbon was put beforehand in an alumina pot including 10 alumina balls having a diameter of 10 mm, the pot was set in a planetary ball mill (pulverisette 5 manufactured by FRITSCH Company), and milling was performed at 350 rpm for 1 hour for Example 2-7, for 2 hours for Example 2-8 and for 5 hours for Example 2-9.

Example 2-10

A nonaqueous electrolyte secondary battery according to Example 2-10 was prepared in the same manner as in Example 1-6 using hard carbon identical to that in Example 1-6.

Comparative Examples 2-3 and 2-4

Nonaqueous electrolyte secondary batteries according to Comparative Examples 2-3 and 2-4 were prepared in the same manner as in Example 2-10 except that a powder of hard carbon was put beforehand in an alumina pot including 10 alumina balls having a diameter of 10 mm, the pot was set in a planetary ball mill (pulverisette 5 manufactured by FRITSCH Company), and milling was performed at 350 rpm for 2 hours for Comparative Example 2-3 and for 5 hours for Comparative Example 2-4.

(Measurement of Half Width of Amorphous Carbon)

For amorphous carbon used for the negative active materials according to Examples 2-1 to 2-10 and Comparative Examples 2-1 to 2-4, the half width was determined by making an X-ray diffraction measurement in accordance with the following conditions and procedure. A powder X-ray diffraction measurement was made using an X-ray diffractometer (manufactured by Rigaku Corporation, Model: MiniFlex II). The radiation source was CuKα, and the acceleration voltage and current were 30 kV and 15 mA, respectively. For the obtained X-ray diffraction data, the half width was determined for the diffraction peak present at $2\theta=27°\pm2°$ on an X-ray diffraction chart using "PDXL", attached software of the X-ray diffractometer.

<Battery Test>

For the batteries of Examples 2-1 to 2-10 and Comparative Examples 2-1 to 2-4, a test was conducted in the same manner as in Example 1 to determine the battery capacity and the low SOC power. Charge/discharge was performed under the following conditions to determine discharge energy.

(Discharge Energy)

After the initial charge-discharge step, the batteries of Examples 2-1 to 2-10 and Comparative Examples 2-1 to 2-4 were subjected to constant current constant voltage charge with a current of 0.1 CmA and a voltage of 4.2 V after 10 minutes of rest. The charge termination condition was set at a time point at which the current value decreased to 0.02 CmA. Further, after 10 minutes of rest, constant current discharge with a current of 0.1 CmA and a final voltage of 2.0 V was performed, and energy at the time of the constant current discharge was defined as "discharge energy (mWh)". The environmental temperature during charge/discharge was 25° C.

The test results for the nonaqueous electrolyte secondary batteries according to Examples 2-1 to 2-10 and Comparative Examples 2-1 to 2-4 are shown in Table 2.

TABLE 2

|  | Ratio of amorphous carbon | Half width (degree) | Electrodeposition | Discharge energy (mWh) | Battery capacity (mAh) | Low SOC power (W) |
|---|---|---|---|---|---|---|
| Example 2-1 | 10 | 2.1 | ○ | 83 | 23.0 | 22 |
| Example 2-2 | 10 | 3.2 | ○ | 81 | 22.7 | 22 |
| Example 2-3 | 10 | 4.4 | ○ | 79 | 22.5 | 20 |
| Example 2-4 | 10 | 5.1 | ○ | 79 | 22.5 | 18 |
| Example 2-6 | 10 | 6.0 | ○ | 78 | 22.4 | 20 |
| Comparative Example 2-1 | 10 | 6.7 | ○ | 65 | 18.9 | 18 |
| Comparative Example 2-2 | 10 | 7.3 | ○ | 61 | 18.2 | 16 |
| Example 2-6 | 50 | 2.1 | ○ | 75 | 22.0 | 22 |
| Example 2-7 | 50 | 3.2 | ○ | 74 | 21.5 | 23 |
| Example 2-8 | 50 | 4.4 | ○ | 71 | 21.0 | 21 |
| Example 2-9 | 50 | 6.1 | ○ | 69 | 20.5 | 20 |
| Example 2-10 | 50 | 6.0 | ○ | 68 | 20.1 | 24 |
| Comparative Example 2-3 | 50 | 6.7 | ○ | 58 | 17.2 | 23 |
| Comparative Example 2-4 | 50 | 7.3 | ○ | 53 | 15.7 | 22 |

From Table 2, it has been apparent that when the half width of amorphous carbon contained in a mixture of graphite and amorphous carbon is 6.0° or less, discharge energy as a battery is improved, and the battery capacity and the low SOC power are increased.

When the half width of amorphous carbon is large and crystallinity is low, a nonaqueous electrolyte secondary battery having a high battery capacity and a high power cannot be obtained, and therefore amorphous carbon that is used in the nonaqueous electrolyte secondary battery of the present invention is preferably one having a small half width and high crystallinity.

Example 3

In Example 1, as a lithium transition metal composite oxide represented by the composition formula: $Li_{1+\alpha}Me_{1-\alpha}O_2$ (wherein Me is a transition metal element including Co, Ni and Mn; and $\alpha>0$), one having a Li/Me molar ratio, i.e. $(1+\alpha)/(1-\alpha)$, of 1.3 was used to conduct experiments, but in this Example, those having Li/Me molar ratios of 1.25 and 1.4, respectively, were used to conduct experiments.

Example 3-1

A nonaqueous electrolyte secondary battery according to Example 3-1 was prepared in the same manner as in Example 1-2 except that 0.942 g of lithium carbonate was added to 2.304 g of the coprecipitation carbonate precursor in stead of adding 0.970 g of lithium carbonate to 2.278 g of the coprecipitation carbonate precursor, the Li/Me molar ratio was changed from 1.3 to 1.25, and a lithium transition metal composite oxide $Li_{1.11}Co_{0.11}Ni_{0.18}Mn_{0.60}O_2$ containing 2100 ppm of Na was prepared.

A nonaqueous electrolyte secondary battery according to Example 3-2 was prepared in the same manner as in Example 1-2 except that 1.021 g of lithium carbonate was added to 2.228 g of the coprecipitation carbonate precursor in stead of adding 0.970 g of lithium carbonate to 2.278 g of the coprecipitation carbonate precursor, the Li/Me molar ratio was changed from 1.3 to 1.4, and a lithium transition metal composite oxide $Li_{1.17}Co_{0.10}Ni_{0.17}Mn_{0.56}O_2$ containing 2100 ppm of Na was prepared.

A battery test was conducted in the same manner as in Example 1-2.

The test results for the nonaqueous electrolyte secondary batteries according to Examples 3-1 and 3-2 are shown in Table 3.

TABLE 3

|  | Li/Me ratio | Negative electrode | Ratio of amorphous carbon | Electro-deposition | Battery capacity (mAh) |
|---|---|---|---|---|---|
| Example 3-1 | 1.25 | Graphite/ amorphous carbon | 10 | ○ | 20.5 |
| Example 3-2 | 1.4 | Graphite/ amorphous carbon | 10 | ○ | 22.5 |

From Table 3, it is apparent that in the case of the nonaqueous electrolyte secondary batteries of Examples 3-1 and 3-2, even if high-potential formation is performed, deposition of Li does not occur on the negative electrode, and the battery capacity is as large as 20 mAh or more. In the present invention, as described in paragraph [0050], amorphous carbon is mixed with graphite to form a negative active material, whereby a low SOC region having a high resistance, which is a weak point of the "lithium-excess-type" positive active material, can be cut, so that the low SOC power is improved. Accordingly, it is considered that the Li/Me ratio has little influence on the low SOC power of the battery, and therefore it can understand that the low SOC power of the nonaqueous electrolyte secondary battery of each of Examples 3-1 and 3-2 is comparable to that in Example 1-2, i.e. 17 W or more.

As described above, in the present invention, a positive electrode having a positive active material containing a lithium transition metal composite oxide represented by the composition formula: $Li_{1+\alpha}Me_{1-\alpha}O_2$ (wherein Me is a transition metal element including Co, Ni and Mn; and $\alpha>0$) and a negative electrode having a negative active material which contains a carbon material that is a mixture of graphite and amorphous carbon and in which the ratio of the amorphous carbon contained in the carbon material is 5 to 60% by mass are combined to obtain a nonaqueous electrolyte secondary battery having a large battery capacity and a high power while deposition of Li in high-potential formation is suppressed.

According to the present invention, a nonaqueous electrolyte secondary battery is obtained which has a large battery capacity and a high power while deposition of Li on a negative electrode during high-potential formation is suppressed, and this nonaqueous electrolyte secondary battery is useful as a nonaqueous electrolyte secondary battery for a hybrid vehicle and an electric vehicle.

What is claimed is:

1. A nonaqueous electrolyte secondary battery comprising a positive electrode, a negative electrode and a nonaqueous electrolyte, wherein the positive electrode has a positive active material containing a lithium transition metal composite oxide having an $\alpha$-$NaFeO_2$-type crystal structure and represented by the composition formula: $Li_{1+\alpha}Me_{1-\alpha}O_2$ (wherein Me is a transition metal element including Co, Ni and Mn; and $\alpha>0$), the negative electrode has a negative active material containing a carbon material that is a mixture of graphite and amorphous carbon, the ratio of the amorphous carbon to the total amount of the graphite and amorphous carbon contained in the carbon material is 5 to 40% by mass, and a charge capacity per negative active material is 372 mAh/g or more.

2. The nonaqueous electrolyte secondary battery according to claim 1, wherein the amorphous carbon has a half width of 6.0° or less, the half width being that of the (002) diffraction line in X-ray diffraction measurement.

3. The nonaqueous electrolyte secondary battery according to claim 1, wherein the positive active material contains Na.

4. A method for production of the nonaqueous electrolyte secondary battery according to claim 1, wherein the method comprises a charge step which at least leads to a region where a potential change occurring, with respect to a charging electric quantity, in a positive electrode potential range of more than 4.3 V (vs. Li/Li$^+$) and 4.8 V (vs. Li/Li$^+$) or less is relatively flat.

5. The method for production of a nonaqueous electrolyte secondary battery according to claim 4, wherein the charge step is a charge step in an initial charge-discharge step.

6. The method for production of a nonaqueous electrolyte secondary battery according to claim 4, wherein the method comprises a charge step in which a charge capacity per negative active material is 372 mAh/g or more in the charge step.

7. The nonaqueous electrolyte secondary battery according to claim 1, wherein a ratio of moles of Li to moles of Me is from 1.2 to 1.6.

8. The nonaqueous electrolyte secondary battery according to claim 1, wherein a ratio of moles of Li to moles of Me is from 1.25 to 1.45.

9. The nonaqueous electrolyte secondary battery according to claim 1, wherein a ratio of moles of Co to moles of Me is from 0.02 to 0.23.

10. The nonaqueous electrolyte secondary battery according to claim 1, wherein a ratio of moles of Mn to moles of Me is from 0.63 to 0.72.

11. The nonaqueous electrolyte secondary battery according to claim 1, wherein a ratio of moles of Mn to moles of Me is from 0.65 to 0.71.

12. The nonaqueous electrolyte secondary battery according to claim 1, wherein the lithium transition metal composite oxide further comprises 900 ppm or more and 16,000 ppm or less of Na.

13. The nonaqueous electrolyte secondary battery according to claim 1, wherein the lithium transition metal composite oxide further comprises 1,000 ppm or more and 12,000 ppm or less of Na.

14. The nonaqueous electrolyte secondary battery according to claim 1, wherein the lithium transition metal composite oxide further comprises 2,000 ppm or more and 10,000 ppm or less of Na.

15. The nonaqueous electrolyte secondary battery according to claim 1, wherein the ratio of the amorphous carbon to the total amount of the graphite and amorphous carbon contained in the carbon material is 5 to 30% by mass.

16. The nonaqueous electrolyte secondary battery according to claim 1, wherein the ratio of the amorphous carbon to the total amount of the graphite and amorphous carbon contained in the carbon material is 10 to 40% by mass.

17. The nonaqueous electrolyte secondary battery according to claim 1, wherein the ratio of the amorphous carbon to the total amount of the graphite and amorphous carbon contained in the carbon material is 10 to 30% by mass.

18. The nonaqueous electrolyte secondary battery according to claim 1, wherein the negative active material consists essentially of the carbon material.

19. A nonaqueous electrolyte secondary battery comprising a positive electrode, a negative electrode and a nonaqueous electrolyte, wherein the positive electrode has a positive active material containing a lithium transition metal composite oxide having an $\alpha$-$NaFeO_2$-type crystal structure and represented by the composition formula: $Li_{1+\alpha}Me_{1-\alpha}O_2$ (wherein Me is a transition metal element including Co, Ni and Mn; and $\alpha>0$), a ratio of moles of Mn to moles of Me is from 0.63 to 0.72, a ratio of moles of Li to moles of Me is from 1.2 to 1.6, the positive active material has a peak differential pore volume of 0.85 mm$^3$/(g·nm) or more in a pore region of 30 to 50 nm, the negative electrode has a negative active material consists essentially of a carbon material that is a mixture of graphite and amorphous carbon, and a ratio of the amorphous carbon to the total amount of the graphite and amorphous carbon contained in the carbon material is 5 to 40% by mass.

* * * * *